(No Model.)
J. L. JÖNSSON.
ELASTIC COLLAR BEARING FOR CENTRIFUGAL MACHINES.
No. 581,423. Patented Apr. 27, 1897.
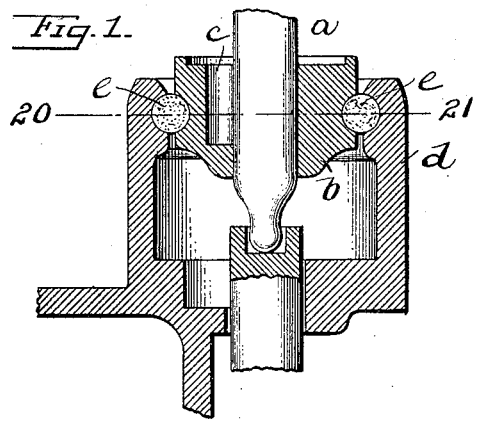
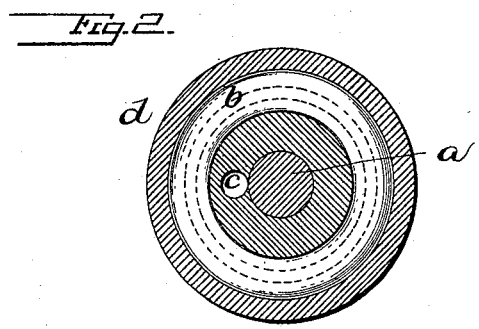
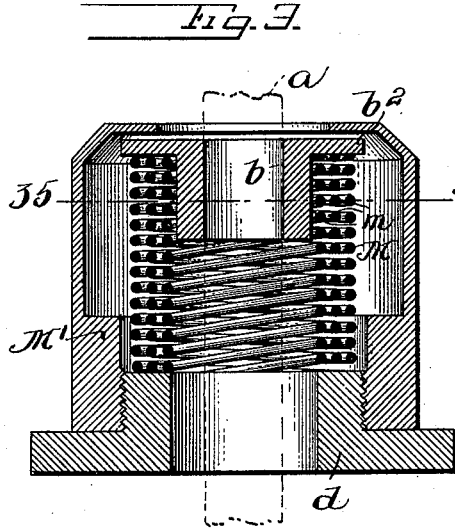
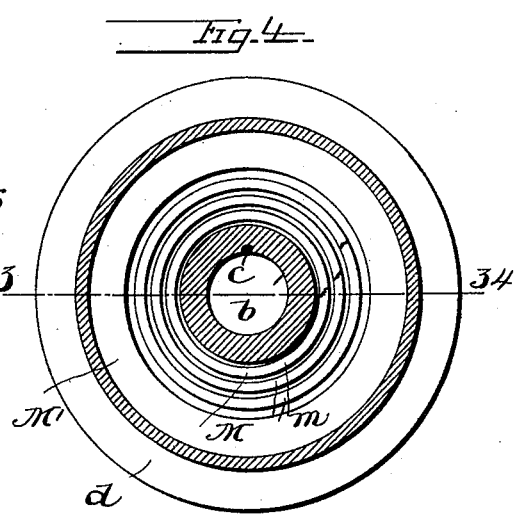
Witnesses.
Jesse B. Heller
Carol H Deshong
Inventor.
Johan Ludvig Jönsson
M H Harding
Attorney.

UNITED STATES PATENT OFFICE.

JOHAN LUDVIG JÖNSSON, OF STOCKHOLM, SWEDEN, ASSIGNOR TO THE AKTIEBOLAGET SEPARATOR, OF SWEDEN.

ELASTIC COLLAR-BEARING FOR CENTRIFUGAL MACHINES.

SPECIFICATION forming part of Letters Patent No. 581,423, dated April 27, 1897.

Application filed May 12, 1896. Serial No. 591,216. (No model.) Patented in Sweden July 4, 1895, No. 6,169.

*To all whom it may concern:*

Be it known that I, JOHAN LUDVIG JÖNSSON, a subject of the King of Sweden and Norway, residing at Stockholm, in the Kingdom of Sweden, have invented a new and useful Improvement in Elastic Collar-Bearings for Centrifugal Machines, (for which I have obtained a patent in Sweden, No. 6,169, dated July 4, 1895,) of which the following is a full, clear, and exact description, reference being had to the accompanying drawings, which form a part of this specification.

In elastic collar-bearings for the rotating shaft a spindle of centrifugal machines heretofore in use the necessary elasticity is effected by placing a rubber between the rotating portion of the bearing and the fixed portion of the bearing or box surrounding the same and generally connected with the machine-frame.

I have illustrated in Figures 1 and 2 such a device. Of these views, Fig. 1 is a vertical sectional view, and Fig. 2 a section on line 20 21 of Fig. 1.

$a$ is the rotating shaft or spindle, the bearing consisting of a collar portion $b$, provided with the orifice $c$ for lubrication. The surrounding box portion $d$ is cast together with the machine-frame.

$e$ is a rubber ring placed between the collar portion $b$ and the box portion $d$.

This device, as well as all others where the elastic lining consists in a rubber ring, has proved very inconvenient, so far as the rubber ring is concerned, for the reason that the grease or oil is forced or squeezed out into the interstices between the collar and box. After having been used but a short time the rubber ring becomes porous and loses its elasticity and no longer gives elasticity to the collar and it strikes against the box, and the ring must then be replaced by a fresh ring. This changing of the rubber ring involves considerable expense and also considerable time is wasted, and, again, if the spoiled rubber ring be not changed at once the centrifugal machine works badly, and even in the most favorable cases causes trouble, because the spindle and the bowl, solidly secured to the same, are liable to become detached from the bearing and by the centrifugal force thrown out of the frame. A proper collar-bearing is therefore a very essential detail in the construction of centrifugal machines. It has proved to be practically impossible to arrange these bearings in a satisfactory manner when using rubber rings.

This invention has for its object the construction of collar-bearings without the use of rubber rings and yet provide an elastic collar-bearing; and it consists, essentially, in producing the necessary elasticity by the construction hereinafter fully described.

In Figs. 3 and 4 I have illustrated the construction for carrying out my invention as embodied herein. Fig. 3 is a section on line 33 34 of Fig. 4. Fig. 4 is a sectional plan view on line 35 36 of Fig. 3.

$a$ is the rotating shaft or spindle, the bearing consisting of the collar portion $b$, provided with the orifice $c$ for lubrication. The surrounding box portion $d$ is cast together with the machine-frame.

M is an elastic frame composed of a number of spiral springs $m$, three being shown wound one outside the other, so that a cylinder is formed which is loosely inserted in a recess in the box and rests upon the box. The lower portion of the box has a flange M', which closely surrounds the frame M, but the upper portion of the frame is free from the box. The bearing $b$ projects into the interior of the frame and has a flange $b^2$ resting upon the top of said frame.

Having now fully described my invention, what I claim, and desire to protect by Letters Patent, is—

A metallic shaft-bearing consisting essentially of a collar and box, the collar having a flange, a spring having an orifice in which the collar projects, the spring for a portion only of its extent, being in contact with the box, and its free end in contact with the flange of the collar.

In testimony of which invention I have hereunto set my hand.

JOHAN LUDVIG JONSSON.

Witnesses:
TH. WAWRINSKY,
L. ROMELL.